E. J. POPE.
CUSHION WHEEL.
APPLICATION FILED JULY 16, 1908.

942,741.

Patented Dec. 7, 1909.
2 SHEETS—SHEET 1.

Witnesses
J. L. Mockabee
V. E. Burner

Inventor
Edward J. Pope
By Edson Bros
Attorneys

E. J. POPE.
CUSHION WHEEL.
APPLICATION FILED JULY 16, 1908.

942,741.

Patented Dec. 7, 1909.
2 SHEETS—SHEET 2.

Witnesses

Inventor
Edward J. Pope
By Elson Bros,
Attorneys

UNITED STATES PATENT OFFICE.

EDWARD J. POPE, OF HOLYOKE, MASSACHUSETTS.

CUSHION-WHEEL.

942,741.  Specification of Letters Patent.  Patented Dec. 7, 1909.

Application filed July 16, 1908. Serial No. 443,800.

*To all whom it may concern:*

Be it known that I, EDWARD J. POPE, a citizen of the United States, residing at Holyoke, in the county of Hampden and State of Massachusetts, have invented certain new and useful Improvements in Cushion-Wheels; and I do hereby declare the following to be a full, clear, and exact description of the invention, such as will enable others skilled in the art to which it appertains to make and use the same.

My invention relates to resilient vehicle wheels or combined cushion and pneumatic tired wheels.

It has for its object to provide a wheel which will have the same resiliency as an ordinary pneumatic tired wheel but which is so constructed that the pneumatic tire does not come in contact with the ground and is protected against puncture. It is my intention to simplify the construction of such wheels so as to make them at the same time cheap of manufacture and durable.

Another object is to provide a wheel of this nature which can be changed into a rigid non-resilient wheel when desired as, for instance, when the pneumatic tire becomes worn out or useless from any cause.

The invention consists in constructing the hub of the wheel with two sets of spokes: one set being rigidly mounted on said hub and carrying at their outer ends a felly and rim of the ordinary construction used for holding a pneumatic tire; the other set of spokes being mounted to move longitudinally in radially arranged sockets on the hub and provided with tread portions extending over the pneumatic tire and carrying a solid or cushion tire adapted to come in contact with the ground, said tread portions having inwardly extending foot pieces which engage the outer periphery of the pneumatic tire. Said longitudinally movable spokes are fitted with adjustable collars which may be slipped down against the ends of the sockets in which said spokes are mounted and secured in such position to make the wheel rigid and non-resilient.

The invention also consists in the features of construction and combinations of parts hereinafter described and specified in the claims.

Figure 1:
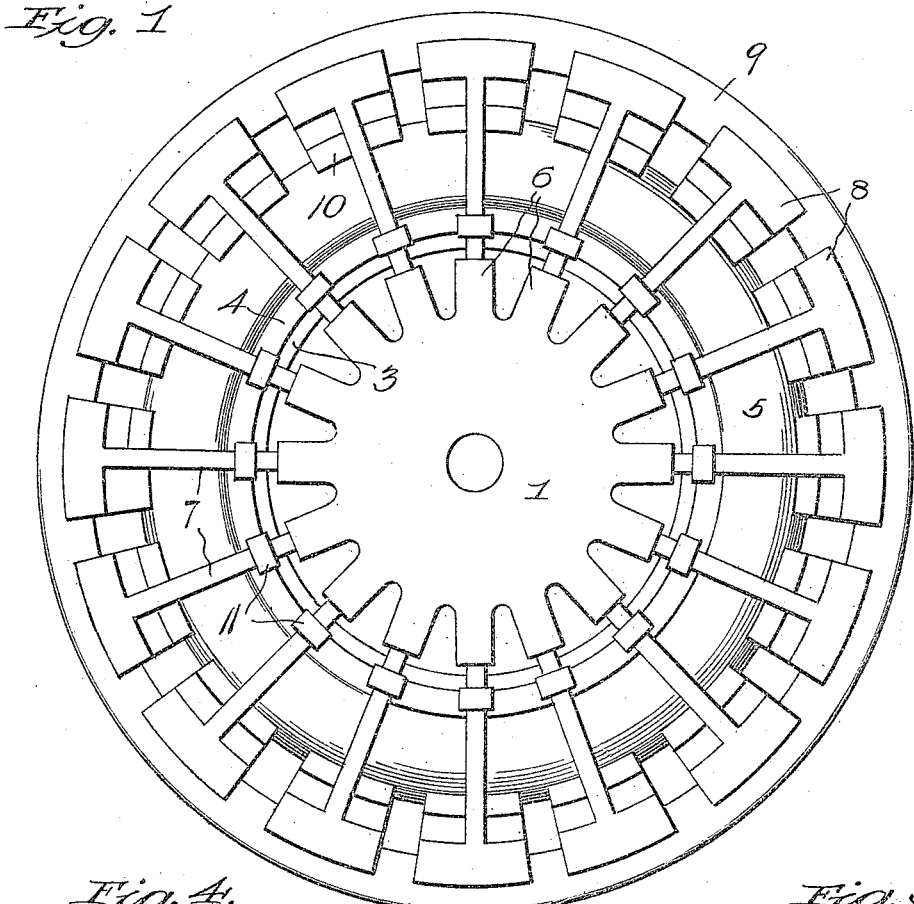
Figure 4:
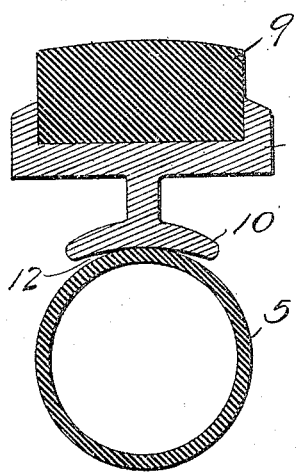
Figure 2:
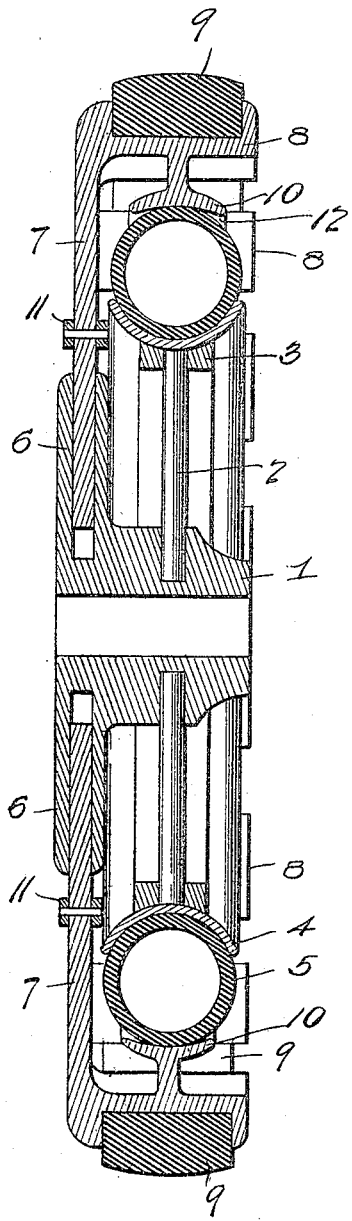
Figure 3:
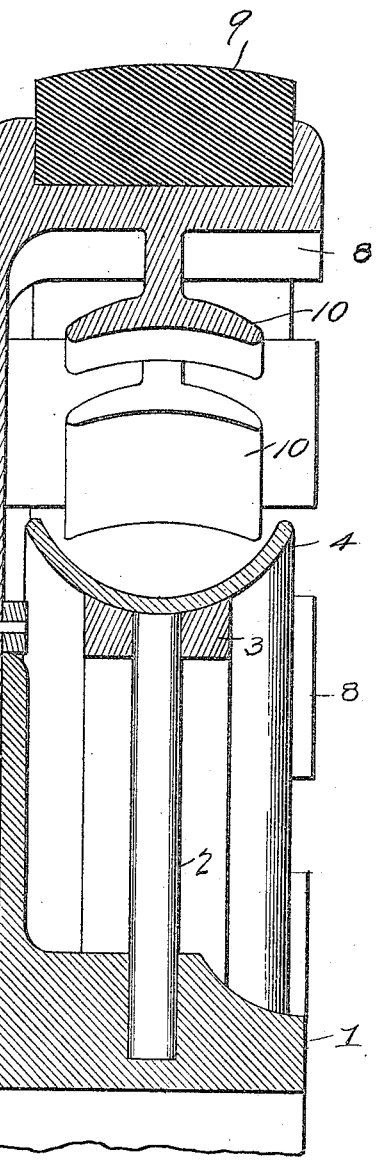

In the accompanying drawings, illustrating the preferred embodiments of my invention: Figure 1 is a side elevation of one of my wheels. Fig. 2 is a transverse sectional view thereof. Fig. 3 is a broken transverse sectional view showing how the wheel may be made rigid and used without a pneumatic tire. Fig. 4 is an enlarged detailed transverse sectional view of the pneumatic tire and the tread portion of one of the longitudinally movable spokes, showing more particularly the shape of the inner face of the foot piece on said tread portion and which engages the outer periphery of the pneumatic tire, and Fig. 5 is a longitudinal sectional view of the same parts which is also designated to show the shape of the inner face of the foot piece.

Referring more particularly to the drawings, 1 designates the hub to which are rigidly secured the spokes 2 carrying at their outer ends an ordinary felly 3 on which is mounted the rim 4 supporting the pneumatic tire 5. Said hub also has made integral therewith or connected thereto in any suitable manner a series of radial sockets 6 in which are mounted to move longitudinally an equal number of spokes 7. Each of said latter spokes has formed on its outer end a tread piece 8 which extends over the pneumatic tire and is grooved to receive a solid or cushion tire 9 which is adapted to engage the ground. Each of said tread pieces has an inwardly extending foot piece 10 which rests upon the outer periphery of the pneumatic tire. Each of the longitudinally movable spokes has mounted thereon a collar 11 which prevents dust or mud from getting into the sockets. Said collars may be slipped down against the ends of the sockets and secured in that position in any suitable manner, as shown in Fig. 3, in case the pneumatic tire becomes worn out or useless from any cause, whereby the wheel is made rigid and non-resilient so that it can be run without the pneumatic tire.

Figure 5:
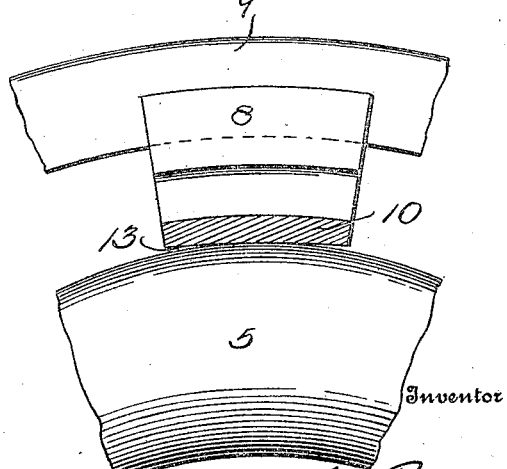

As illustrated more clearly in Figs. 4 and 5, the transverse and longitudinal curves of the inner face of each of the foot pieces 10 are formed with greater radii than the radius of the circular cross-section of the inflated pneumatic tire and the radius of the circle formed by the outer periphery of said inflated pneumatic tire, respectively. This construction normally leaves spaces between the edges of said foot pieces and the pneumatic tire as shown at 12 in Fig. 4 and 13 in Fig. 5. The object of this construction is to allow the pneumatic tire to flatten when the weight comes upon it giving the same result as if said tire were on the ground.

I reserve the right to make such changes from the specific construction shown herein as may fall within the scope of the claims and without departing from the spirit or sacrificing the advantages of my invention.

I claim:

1. A cushion wheel comprising a hub, rigid spokes, a rim supported on said spokes, a tire in said rim, said hub having radial sockets, other spokes mounted in said sockets and each having a tread piece extending over and engaging said tire, the latter spokes being independently movable longitudinally with respect to each other, another continuous tire mounted around said tread pieces and serving to hold them and the movable spokes in proper position, and adjustable collars secured to said movable spokes and adapted to limit the inward movement of said spokes by coming in contact with the ends of said radial sockets.

2. A cushion wheel comprising a hub, rigid spokes, a rim supported on said spokes, a tire in said rim, other spokes separately mounted and each having a tread piece extending over and engaging said tire, the latter spokes being independently movable longitudinally with respect to each other, and another tire mounted upon said tread pieces, the portion of each tread piece which contacts with said first-mentioned tire being curved longitudinally on an arc of greater radius than the periphery of said tire, for the purpose specified.

3. A cushion wheel comprising a hub, rigid spokes, a rim supported on said spokes, a tire in said rim, said hub having radial sockets, other spokes mounted in said sockets and each having a tread piece extending over and engaging said tire, the latter spokes being independently movable longitudinally with respect to each other, and another continuous tire mounted around said tread pieces and serving to hold them and the movable spokes in proper position, the portion of each tread piece which contacts with said first-mentioned tire being curved longitudinally on an arc of greater radius than the periphery of said tire, for the purpose specified.

In testimony whereof, I affix my signature, in presence of two witnesses.

EDWARD J. POPE.

Witnesses:
W. JEFFERY,
GEO. H. BOWKER.